US012214643B2

United States Patent
Gopavaram et al.

(10) Patent No.: US 12,214,643 B2
(45) Date of Patent: Feb. 4, 2025

(54) SYSTEM AND METHOD FOR DETERMINATION OF REQUIRED ENVIRONMENTAL CONDITIONS FOR TRANSPORT AND STORAGE OF GOODS

(71) Applicant: Carrier Corporation, Palm Beach Gardens, FL (US)

(72) Inventors: Subhash Reddy Gopavaram, Telangana (IN); Sumanth Kumar Mukundala, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 334 days.

(21) Appl. No.: 17/738,602

(22) Filed: May 6, 2022

(65) Prior Publication Data

US 2022/0355644 A1 Nov. 10, 2022

(30) Foreign Application Priority Data

May 8, 2021 (IN) .............................. 202111020930

(51) Int. Cl.
*B60H 1/00* (2006.01)
*B60H 3/02* (2006.01)
*B60P 3/20* (2006.01)

(52) U.S. Cl.
CPC ..... *B60H 1/00735* (2013.01); *B60H 1/00014* (2013.01); *B60H 1/00378* (2013.01); *B60H 1/00878* (2013.01); *B60H 3/02* (2013.01); *B60P 3/20* (2013.01)

(58) Field of Classification Search
CPC ............ B60H 1/00735; B60H 1/00014; B60H 1/00378; B60H 1/00878; B60H 3/02; B60P 3/20
See application file for complete search history.

(56) References Cited

U.S. PATENT DOCUMENTS

| 5,444,444 A * | 8/1995 | Ross ......................... B07C 3/00 340/988 |
| 7,209,042 B2 * | 4/2007 | Martin ............... G06K 19/0717 340/572.1 |
| 9,311,586 B2 * | 4/2016 | Robinette .......... G08B 21/0219 |

(Continued)

FOREIGN PATENT DOCUMENTS

CN 107972997 A 5/2018

OTHER PUBLICATIONS

European Search Report for Application No. 22161708.7; Issued Aug. 31, 2022; 7 Pages.

*Primary Examiner* — Gertrude Arthur Jeanglaude
(74) *Attorney, Agent, or Firm* — CANTOR COLBURN LLP

(57) ABSTRACT

A system, for determination of required environmental conditions for transport and storage of goods, that includes one or more boxes to be placed in a vehicle. Each box has an indicator code, on the exterior surface of the box, that includes information related to environmental conditions required to be maintained. A scanning device associated with the vehicle and configured to read said indicator code from each box. A control circuitry is operationally connected to the scanning device The control circuitry is configured to compute the readings of the indicator codes from each box to determine the required environmental conditions to be maintained inside the vehicle.

19 Claims, 2 Drawing Sheets

(56) References Cited

U.S. PATENT DOCUMENTS

| | | | | |
|---|---|---|---|---|
| 9,573,684 | B2* | 2/2017 | Kimchi | ................. B64U 10/14 |
| 10,139,495 | B2* | 11/2018 | Payne | .................... G06Q 10/08 |
| 2018/0365704 | A1 | 12/2018 | Atkinson et al. | |
| 2020/0042933 | A1 | 2/2020 | Jurich, Jr. et al. | |
| 2020/0311666 | A1 | 10/2020 | Gray et al. | |

* cited by examiner

SYSTEM AND METHOD FOR DETERMINATION OF REQUIRED ENVIRONMENTAL CONDITIONS FOR TRANSPORT AND STORAGE OF GOODS

FOREIGN PRIORITY

This application claims priority to Indian Patent Application No. 202111020930, filed May 8, 2021, and all the benefits accruing therefrom under 35 U.S.C. § 119, the contents of which in its entirety are herein incorporated by reference.

TECHNICAL FIELD OF INVENTION

The present invention generally relates to a transport management system. More particularly, the present invention relates to a system to manage ambient environmental conditions for items being transported in a vehicle.

BACKGROUND OF THE INVENTION

Transport and storage of perishable goods, such as, meat, vegetables, groceries, dairy products etc. or non-food items such as medicines that need to be stored at specific environmental conditions, requires maintenance of the required environmental conditions, such as temperature and humidity levels in the vehicle in which the goods are being transported and stored. Conventionally, the environmental conditions of the vehicle are set by a driver/operator of the vehicle, and the system is prone to human error. For example, a driver/operator may forget to set appropriate temperature, or may not be aware of the appropriate temperature or humidity level requirements of all the goods being transported, or may turn-off power supply of the vehicle, thereby, cutting power to an environmental condition regulating system. This results in ruining of the perishable goods or the perishable goods may become stale.

In view of the afore-mentioned problems, there is a need of an effective and efficient system and a method for setting the required environmental conditions inside transport refrigeration system in a vehicle. There is also a requirement to automatically determine and maintain the required environmental conditions for transport of goods. In order to solve the problems in the existing solutions, a system and a method are disclosed.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

Various embodiments of the invention describe a system, for determination of required environmental conditions for transport and storage of goods, that comprises one or more boxes to be placed in a vehicle. Each box of the one or more boxes has an indicator code on the exterior surface of the box, and wherein the indicator code comprises information related to environmental conditions required to be maintained. The system also includes a scanning device associated with the vehicle and configured to read said indicator code from each box. The system further includes a control circuitry operationally connected to the scanning device. The control circuitry is configured to compute the readings of the indicator codes from each box to determine the required environmental conditions to be maintained inside the vehicle.

In an embodiment of the invention, the control circuitry determines an average acceptable set of environmental conditions of the indicator codes of the one or more boxes having different environmental condition requirements.

In another embodiment of the invention, the environmental condition, is at least one of temperature or humidity level.

In yet another embodiment of the invention, the control circuitry is configured to determine the average acceptable set of environmental conditions relative to environmental conditions external to the vehicle.

In another embodiment of the invention, the scanning device and the control circuitry are installed in a transport container.

In still another embodiment of the invention, the system comprises a user device, wherein the average acceptable set of environmental conditions computed by the control circuitry are transmitted to a user device.

In a different embodiment of the invention, the control circuity transmits the average acceptable set of environmental conditions to the user device via a wired connection or a wireless connection.

In yet another embodiment of the invention, the system comprises an environmental condition regulation system.

In an embodiment of the invention, the environmental condition regulation system is at least one of a fan, a cooler, a refrigerator, a humidifier or a dehumidifier, or a heating, ventilation, and air conditioning (HVAC) system placed in the vehicle.

In yet another embodiment of the invention, the user device is configured to set the environmental condition of the vehicle via the environmental condition regulation system.

In another embodiment of the invention, the control circuitry provides a warning indication to the user device if the scanning device data indicates that the environmental condition of the vehicle is outside a threshold range.

In yet another embodiment of the invention, the control circuitry provides a warning indication to the user device, when the power system of the vehicle is off for a threshold period of time, wherein the power system provides power to the environmental condition regulation system.

In another embodiment of the invention, the indicator code is at least one of a barcode, Quick Response (QR) code, a printed text, or an image.

In still another embodiment of the invention, the indicator code is imprinted on the box or imprinted on a sticker placed on the box.

In another embodiment of the invention, the scanning device is a camera.

Various embodiments of the invention describe a method, for determination of required environmental conditions for transport and storage of goods, that comprises reading, via a scanning device an indicator code from each box of one or more boxes placed inside a vehicle. The method also comprises computing the readings of the indicator codes from each box to determine the required environmental conditions inside the vehicle. The method further comprises communicating the information related to environmental conditions required to be maintained inside the vehicle to a user device.

In an embodiment of the invention, the method includes determining, by the control circuitry, an average acceptable set of environmental conditions when the scanning device reads indicator codes of a plurality of boxes having different environmental condition requirements.

In another embodiment of the invention, the method includes transmitting the average acceptable set of environmental conditions computed by the control circuitry to a user device.

In still another embodiment of the invention, the method includes providing, by the control circuitry, a warning indication to the user device if the scanning device data indicates that the environmental condition of the vehicle is outside a threshold range.

In yet another embodiment of the invention, the method includes providing, by the control circuitry, a warning indication to the user device, when the power system of the vehicle is off for a threshold period of time, wherein the power system provides power to an environmental condition regulation system that regulates the environmental condition inside the vehicle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF ACCOMPANYING DRAWINGS

Some of the objects of the invention have been set forth above. These and other objects, features, aspects and advantages of the present invention will become better understood with regard to the following description, appended claims and accompanying drawings where:

Corresponding reference numerals indicate corresponding parts throughout the drawings.

DETAILED DESCRIPTION OF INVENTION

The following detailed description should be read with reference to the drawings in which similar elements in different drawings are numbered the same. The drawings, which are not necessarily to scale, depict illustrative embodiments and are not intended to limit the scope of the invention. Although examples of construction, dimensions, and materials are illustrated for the various elements, those skilled in the art will recognize that many of the examples provided have suitable alternatives that may be utilized.

Description of Embodiments

Figure 1A:
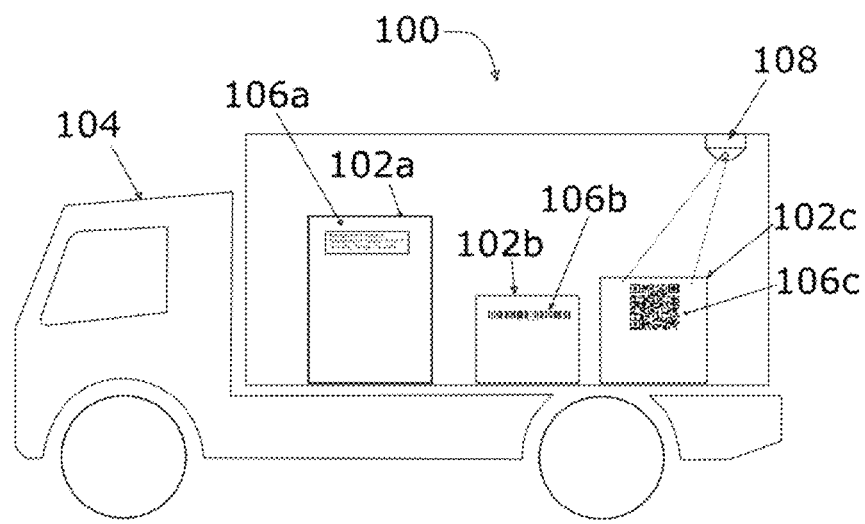
FIG. 1A is a schematic diagram of a system for determination of required environmental conditions for transport and storage of goods.
Figure 1B:
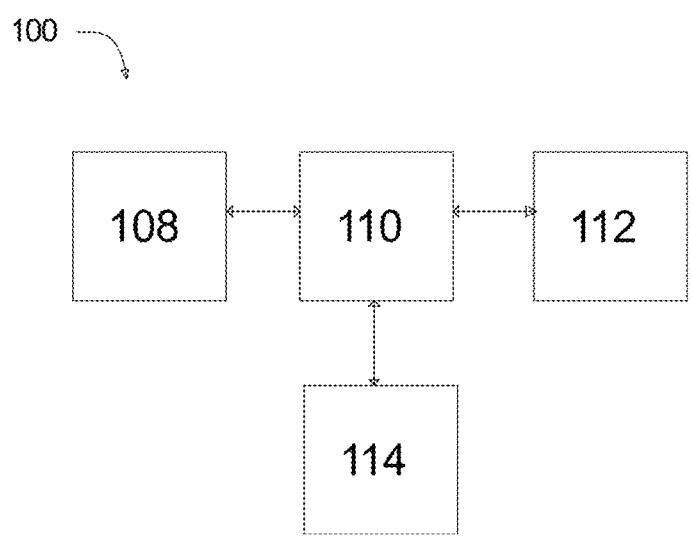
FIG. 1B is a schematic block diagram of the system of FIG. 1A.

FIGS. 1A and 1B depict an embodiment of a system 100, for determination of required environmental conditions for transport and storage of goods, that comprises one or more boxes 102 (102a, 102b, 102c) to be placed in a storage compartment of a vehicle 104. In some instances, the storage compartment of a vehicle can be a transport container placed on the vehicle, for example, a transport container placed on a truck, or it can be an integrated cabin of a vehicle, for example, the storage space in a van. The boxes 102 can be of any shape and size and can be made of any conventionally used materials, such as cardboard, plastic, metals, etc.

As used herein, the vehicle may comprise the transport refrigeration system (TRS) and may be a four-wheeler, a two-wheeler, a bus, a truck, a caravan or any such vehicle which is well known in the art.

Each box 102 of the one or more boxes 102 has an indicator code 106 (106a, 106b, 106c) on the exterior surface of the box 102. The indicator code 106 can be any of a printed text 106a, a barcode 106b, Quick Response (QR) code 106c, or an image which may be scanned to decipher further information.

Each indicator code 106 comprises information related to environmental conditions required to be maintained in the storage compartment of the vehicle 104. The environmental condition can be the temperature and humidity level of the compartment of the vehicle 104 in which the boxes 102 are stored. For example, a good, such as, a vaccine, may be required to be stored and transported within the temperature range of 5-10° C. and at a humidity level of 10-20%, then said information is stored on the indicator code 106 placed on the box 102 which is relevant for storing that good. The indicator code 106 can be imprinted on the box 102 directly. Alternatively, the indicator code 106 can be imprinted on a sticker and then placed on the box 102.

The system 100 includes a scanning device 108 associated with the vehicle 104 and configured to read said indicator code 106 from each box 102. The scanning device 108 can be a camera or a laser scanner/barcode reader placed at the roof or wall panel or a door of the storage compartment of the vehicle 104. The scanning device 108 uses image processing techniques to read the information stored in the indicator code 106. In some embodiments, there can be a plurality of scanning devices placed within the storage compartment of the vehicle 104.

The system includes a control circuitry 110 operationally connected to the scanning device 108. The control circuitry 110 can include a microprocessor or microcontroller programmed to receive and process information read by the scanning device 108. The control circuitry 110 is configured to compute the readings of the indicator codes 106 from each box 102 to determine the required environmental conditions to be maintained inside the vehicle 104. In case of plurality of boxes 102, the control circuitry 110 determines an average acceptable set of environmental conditions of the indicator codes 106 of the one or more boxes 102 having different environmental condition requirements. The control circuitry 110 is also configured to determine the average acceptable set of environmental conditions relative to environmental conditions external to the vehicle 104. In some embodiments, the control circuitry 110 can be connected to temperature or humidity sensors present on the outside of the vehicle 104 to measure the external environmental conditions.

In some embodiments, where the scanning device 108 is a camera, the control circuitry 110 can include an image processing system that can identify characteristics, such as, the size, shape, dimensions, type of boxes 102 and goods placed inside the vehicle 104. The control circuitry 110 may use the information received from the image processing system to determine the average acceptable environmental conditions for the storage compartment of the vehicle 104.

In some embodiments, the control circuitry 110 may be connected to one or more weight sensors placed at the floor of the storage compartment of the vehicle 104 to determine the weight of the one or more boxes. The control circuitry 110 may use the information received from the weight sensors to determine the average acceptable environmental conditions for the storage compartment of the vehicle 104.

In some embodiments, the control circuitry 110 may use data from several sources such as, external temperature or humidity sensors, the image processing system and the weight sensors to determine the average acceptable environmental conditions for the storage compartment of the vehicle 104.

The system comprises a user device 112, such as an infotainment system of a vehicle or a hand-held device of the vehicle operator or a remotely connected computer, tablet, smartphone, or a wearable device such as a google glass, or a smart watch. The average acceptable set of environmental conditions computed by the control circuitry 110 are transmitted to the user device 112. For example, the average acceptable range of temperature that needs to be maintained in the storage compartment of a van is communicated to the driver of the van on the infotainment system of the van via a wired or wireless connection. As another example, the average acceptable temperature and humidity level required to be maintained within a transport container being transported on a truck or ship or any other vehicle is communicated to a remote computer of a centralized transport management system via wireless communication such as internet. As another example, the average acceptable temperature and humidity level required to be maintained within the cargo-hold of a truck is communicated to a hand-held or wearable device of the driver of the truck via localized wireless modalities such as Bluetooth, Wi-Fi, etc. The acceptable temperature and humidity level may also be provided to a vehicle infotainment system.

There may be instances, where the environmental conditions of the storage compartment fall outside the average acceptable threshold range, in such instances, the control circuitry 110 provides a warning indication to the user device 112 if the scanning device 110 data indicates that the environmental condition of the storage compartment of the vehicle 104 is outside the threshold range.

In some embodiments, the system 100 includes an environmental condition regulation system 114. The environmental condition regulation system can be any of a fan, a cooler, a refrigerator, a humidifier or a dehumidifier, or a heating, ventilation, and air conditioning (HVAC) system placed in the vehicle 104. For example, an HVAC system attached to a storage compartment of a truck. The user device 112 can set the environmental condition of the vehicle 104 via the environmental condition regulation system 114. For example, the driver of a vehicle can set the temperature and humidity level of the storage compartment of the vehicle via the vehicle infotainment system of the truck.

In several instances the environmental condition regulation system can be powered by the drive system of the vehicle, for example, an internal combustion engine, an electric drive train, etc., or it can have an independent power source such as a generator or battery storage. In instances where the environmental condition regulation system is powered by the drive system of the vehicle, there may be circumstances, where the driver of the vehicle may turn off the drive system, or the drive system may shut down automatically, due to any reason such as a malfunction or low fuel or energy capacity, for a period of time long enough that the environmental conditions of the storage compartment of the vehicle 104 falls beyond the average acceptable threshold limits. In such instances, the control circuitry 110 provides a warning indication to the user device 112, for example, a message for the driver to turn on the drive system, or remedy the malfunction or top-up fuel or charge of the system, so that environmental condition regulation system becomes operational again.

Figure 2:
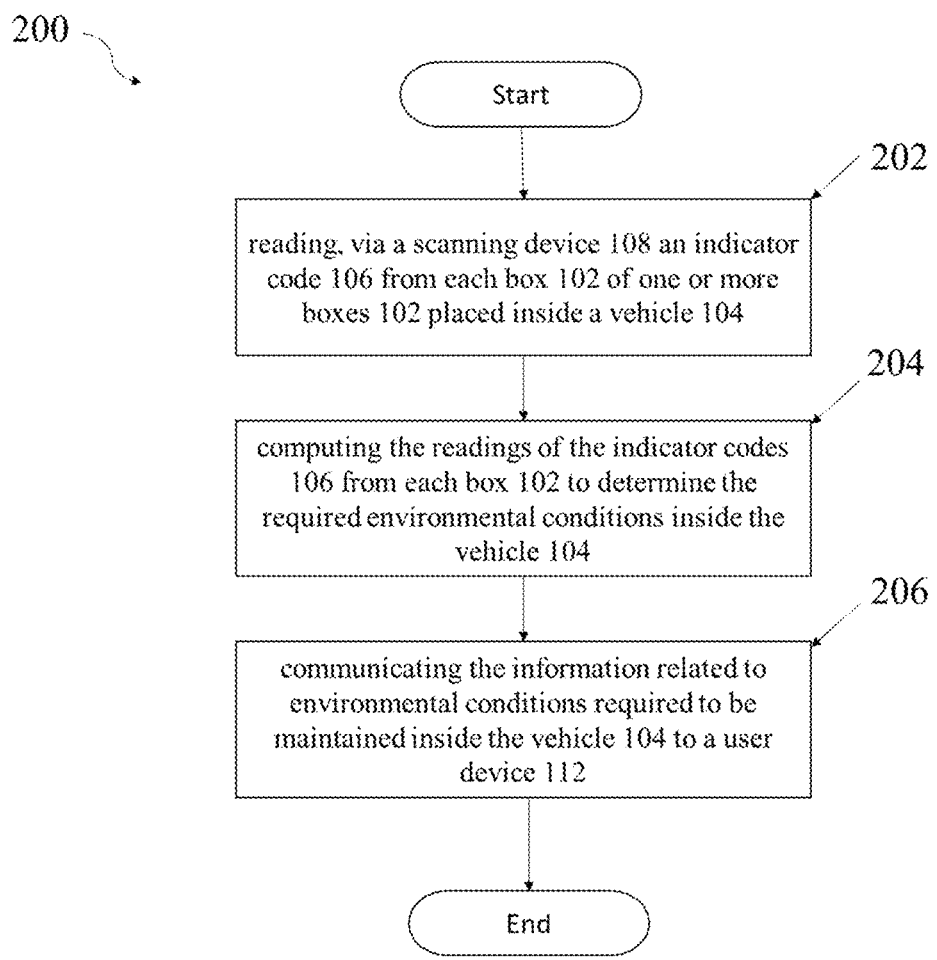
FIG. 2 is a schematic flow diagram representing a method for determination of required environmental conditions for transport and storage of goods.

FIG. 2 depicts a method 200 that comprises a step 202 of reading, via a scanning device 108 an indicator code 106 from each box 102 of one or more boxes 102 placed inside a vehicle 104. The method also comprises a step 204 of computing the readings of the indicator codes 106 from each box 102 to determine the required environmental conditions inside the vehicle 104. In some embodiments, the method includes a step of determining, by the control circuitry 110, an average acceptable set of environmental conditions when the scanning device 108 reads indicator codes of a plurality of boxes 102 having different environmental condition requirements. The method further comprises a step 206 of communicating the information related to environmental conditions required to be maintained inside the vehicle 104 to a user device 112.

In some embodiments, the method includes an additional step of providing, by the control circuitry 110, a warning indication to the user device 112 if the scanning device 108 data indicates that the environmental condition of the vehicle 104 is outside a threshold range.

In some embodiments, the method includes an additional step of providing, by the control circuitry 110, a warning indication to the user device 112, when the power system (for example, an internal combustion engine) of the vehicle 104 is off for a threshold period of time. The power system provides power to an environmental condition regulation system that regulates the environmental condition inside the vehicle 104.

The present invention is applicable to various fields such as, but not limited to, transport of goods, storage of goods, and any such application that is well known in the art.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

The embodiments of the invention discussed herein are exemplary and various modification and alterations to a person skilled in the art are within the scope of the invention.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purposes or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "controller" can refer to substantially any processor or computing processing unit or device comprising, but not limited to comprising, a direct digital control of a HVAC system, a zone controller of the HVAC system, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
   a plurality of boxes to be placed in a vehicle, wherein each box of the plurality of boxes has an indicator code on the exterior surface of the box, and wherein the indicator code stores information defining environmental conditions required to be maintained;
   a scanning device associated with the vehicle and configured to read said indicator code from each box of the plurality of boxes;
   a control circuitry operationally connected to the scanning device, wherein the control circuitry is configured to determine the required environmental conditions to be maintained inside the vehicle in response to the indicator codes from the plurality of boxes;
   wherein the control circuitry determines an average acceptable set of environmental conditions for the plurality of boxes having different environmental condition requirements in response to the indicator codes from the plurality of boxes.

2. The system of claim 1, wherein the environmental condition, is at least one of temperature or humidity level.

3. The system of claim 1, wherein the control circuitry is configured to determine the average acceptable set of environmental conditions relative to environmental conditions external to the vehicle.

4. The system of claim 1, wherein the scanning device and the control circuitry are installed in a transport container.

5. The system of claim 1, wherein the system comprises a user device, wherein the average acceptable set of environmental conditions computed by the control circuitry are transmitted to a user device.

6. The system of claim 5, wherein the control circuity transmits the average acceptable set of environmental conditions to the user device via a wired connection or a wireless connection.

7. The system of claim 1, wherein the system comprises an environmental condition regulation system.

8. The system of claim 7, wherein the environmental condition regulation system is at least one of a fan, a cooler, a refrigerator, a humidifier or a dehumidifier, or a heating, ventilation, and air conditioning (HVAC) system placed in the vehicle.

9. The system of claim 7, wherein the user device is configured to set the environmental condition of the vehicle via the environmental condition regulation system.

10. The system of claim 5, wherein the control circuitry provides a warning indication to the user device if the scanning device data indicates that the environmental condition of the vehicle is outside a threshold range.

11. The system of claim 5, wherein the control circuitry provides a warning indication to the user device, when the power system of the vehicle is off for a threshold period of time, wherein the power system provides power to the environmental condition regulation system.

12. The system of claim 1, wherein the indicator code is at least one of a barcode, Quick Response (QR) code, a printed text, or an image.

13. The system of claim 12, wherein the indicator code is imprinted on each of the plurality of boxes or imprinted on a sticker placed each of the plurality of boxes.

14. The system of claim 1, wherein the scanning device is a camera.

15. The system of claim 14, wherein the control circuitry comprises an image processing system that processes the images received from the camera to determine characteristics of the plurality of boxes, and wherein the control circuitry uses the information received from the image processing system to determine the average acceptable environmental conditions for the storage compartment of the vehicle.

16. The system of claim 1, wherein the control circuitry is connected to one or more weight sensors placed in the vehicle that determines the weight of the plurality of boxes, and wherein the control circuitry uses the information received from the weight sensors to determine the average acceptable environmental conditions for the storage compartment of the vehicle.

17. A method comprising:
reading, via a scanning device an indicator code from each of a plurality of boxes placed inside a vehicle, wherein the indicator code stores information defining environmental conditions required to be maintained;
determining required environmental conditions inside the vehicle in response to the indicator codes from each box of the a plurality of boxes;
determining an average acceptable set of environmental conditions when the scanning device reads indicator codes of the plurality of boxes having different environmental condition requirements;
communicating the average acceptable set of environmental conditions to a user device.

18. The method of claim 17, wherein the method includes:
providing a warning indication to the user device if the scanning device data indicates that the environmental condition of the vehicle is outside a threshold range.

19. The method of claim 17, wherein the method includes:
providing a warning indication to the user device, when the power system of the vehicle is off for a threshold period of time, wherein the power system provides power to an environmental condition regulation system that regulates the environmental condition inside the vehicle.

* * * * *